United States Patent [19]

Akitomo et al.

[11] 4,283,732
[45] Aug. 11, 1981

[54] RECORDING SYSTEM WITH INTER-LINE SPACE POSITIONING MEANS

[75] Inventors: Nobuo Akitomo; Shigeo Tohyama, both of Katsuta, Japan

[73] Assignee: Hitachi, Ltd., Tokyo, Japan

[21] Appl. No.: 121,091

[22] Filed: Feb. 13, 1980

[30] Foreign Application Priority Data

Mar. 2, 1979 [JP] Japan .................. 54/24957

[51] Int. Cl.³ .................. G01D 15/16; G01D 9/00; G01D 15/24
[52] U.S. Cl. .................. 346/112; 346/33 A; 346/136
[58] Field of Search ............. 346/112, 113, 118, 33 A, 346/136

[56] References Cited

U.S. PATENT DOCUMENTS

| | | | |
|---|---|---|---|
| 1,766,741 | 6/1930 | Butters | 346/118 X |
| 3,241,432 | 3/1966 | Skeggs et al. | 346/136 UX |
| 3,656,041 | 4/1972 | Bonzano | 346/136 UX |
| 3,702,922 | 11/1972 | Hall, Jr. et al. | 346/112 UX |
| 4,038,664 | 7/1977 | Muir | 346/33 A X |
| 4,228,439 | 10/1980 | Weingartner | 346/113 X |

*Primary Examiner*—George H. Miller, Jr.
*Attorney, Agent, or Firm*—Craig and Antonelli

[57] ABSTRACT

A recording sheet is successively fed in the abscissa direction by means of a sprocket. The recording sheet is previously printed with ruled lines with a predetermined inter-line space in the ordinate direction thereof. The sprocket is driven by a pulse motor. Displacement of the recording sheet from one to the next ruled line corresponds to the number of pulses supplied to the pulse motor. Before the beginning of the recording, a ruled line on the recording sheet is brought into positional coincidence with the recording pen. During the movement of the recording sheet after the recording operation having been started, a counter counts the pulses supplied to the pulse motor and is reset every time when the number of the pulses corresponding to the inter-line space has been attained. Upon termination of the recording, the contents in the counter represents the position of a recording pen relative to a certain ruled line. On the basis of the contents in the counter, the recording sheet is automatically fed in the abscissa direction. Upon occurrence of coincidence between the certain ruled line and the recording pen position, the feeding of the recording sheet is stopped. In this manner, the recording pen is always positioned in alignment with one of the ruled lines on the recording sheet at the beginning of the succeeding recording operation, requiring no manipulatability for the positional alignment.

22 Claims, 11 Drawing Figures

RECORDING SYSTEM WITH INTER-LINE SPACE POSITIONING MEANS

BACKGROUND OF THE INVENTION

1. Field of the Invention

The present invention relates generally to a recording system and in particular concerns a system for controlling relative movement between recording means and ruled lines printed on a recording sheet.

2. Description of the Prior Art

Usually, a recording system or apparatus for recording data on a recording strip or sheet is employed as one of the means for displaying the analysis results of analyzing apparatus, output informations from various measuring instruments. The analyzed results are recorded on the recording sheet strip with a certain physical quantity taken along the abscissa as a first variable, while a second physical quantity related to the first quantity is taken along the ordinate. For the quantity taken along the abscissa, there may be enumerated, for example, wavelength or wavenumber in a spectrophotometer, retention time in the case of a chromatograph such as gas or liquid chromatograph, massnumber in the case of a mass spectrum measured by a mass spectrometer, chemical shift in a absorption spectrum in the case of a nuclear magnetic resonance spectrometer and so forth. In most cases of the measurement systems, time is taken along the abscissa.

For the recording of the analyzed results on a recording sheet, it is a prerequisite that the analyzed results are recorded in one-to-one correspondence to the abscissa and the ordinate, respectively. On this assumption, a sample is analyzed in respect of quality or quantity. Accordingly, in order to carry out an analysis with a high accuracy, it is required that variation or displacement in the abscissa direction can be readily read with a high accuracy. In order to meet such requirement, the recording sheet or strip is usually printed with ruled lines with a predetermined inter-line space in the ordinate direction thereof. Various rules or line spaces are adopted. However, the most familiar is a recording sheet printed with an inter-line space of 1 cm. As an attempt to incerease the accuracy, there may be employed a marker system which is adapted for recording a short marker for a space of 1 mm, an intermediate marker for a space of 5 mm and a long marker for a space of 10 mm, for example.

However, if a facilitated reading of variation along the abscissa is of a primary concern, it is preferred to make use of the ruled lines printed previously on the recording sheet. In this case, when spectrum in the wavelength range of 300 nm to 400 nm is to be recorded in the measurement with a spectrophotometer, operator sets at first the position of a recording or writing pen in alignment with a given one of the ruled line in precedence to the starting of the measurement. Assuming that the recording sheet is fed in the abscissa direction at a feeding rate of 20 nm/cm, displacements such as 320 nm, 340 nm and so forth can be offhand read with the space of 20 nm. The positional coincidence between the recording pen and one of the ruled lines in precedence to the initiation of the measurement is required also in the case where the marker system is utilized, because otherwise the ruled line will not be aligned with the marker, thereby reducing the advantages provided by the use of the ruled lines. On the contrary, the presence of the ruled lines may provide obstacle for the reading along the abscissa.

In conjunction with the use of the ruled lines on a recording sheet, there has heretofore been a problem that the writing pen position has to be brought into alignment with a selected one of the ruled lines every time when the measurement is initiated, involving cumbersome manipulation. In conventional measurements, the recording pen will not always coincide with the ruled line after completion of a single measurement. Rather, misalignment will occur more frequently. Accordingly, for the recording with the aid of the ruled lines, operation for aligning the pen position with a selected one of the ruled lines is required for every measurement, which is of course a troublesome procedure.

SUMMARY OF THE INVENTION

An object of the invention is to provide a recording system with improved manipulatability.

Another object of the invention is to provide a recording system which allows displacement along the abscissa to be read in a much facilitated manner.

Still another object of the invention is to provide a recording apparatus which exhibits an improved manipulatability and operation performance without requiring the use of any specific recording sheet.

According to the present invention, positional coincidence between the recording means and a given one of the ruled lines on a recording sheet is automatically accomplished on the basis of information about the variable relationship between the ruled line and the recording means which in turn depends on variation in the relative position between the recording means and the recording sheet.

DETAILED DESCRIPTION OF THE PREFERRED EMBODIMENTS

Now, the invention will be described in detail by referring to the accompanying drawings which show exemplary embodiments of the present invention.

Figure 1:
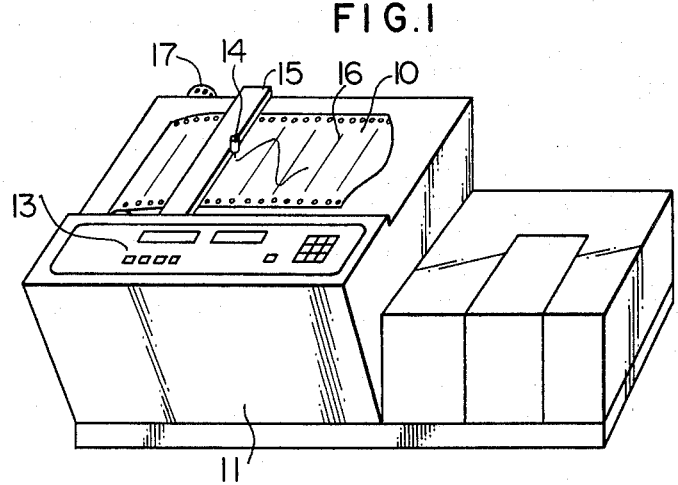
FIG. 1 shows schematically in a perspective view an outer appearance of a spectrophotometer incorporating a recording system according to an embodiment of the present invention.

Referring to FIG. 1 showing in a perspective view an outer appearance of a spectrophotometer incorporating a recording apparatus according to an embodiment of the invention, reference 11 denotes a main body in which an optical system of a spectrophotometer, signal processing system and so forth are accommodated. Since various spectrophotometers of different types have hitherto been known and particular combination of any specific spectrophotometer with the recording apparatus according to the invention will constitute no material part of the invention, description of the spectrophotometer will be unnecessary. There are disposed on the top of the main body 11 a recording sheet 10 and a recording or writing pen 14. Ruled lines 16 are previously printed with a predetermined interline space on the recording sheet 10. The recording pen 14 is supported on a carriage 15 by means of a pen holder and is adapted to be movable in the axial direction of the carriage 15. On the other hand, the recording sheet 10 is adapted to be moved in a longitudinal direction thereof (i.e. in a lateral direction as viewed in FIG. 1) through sprocket means described hereinafter. Accordingly, the recording apparatus illustrated is of Y-T type, which is sometimes referred to also as a flow chart type. In the following, description will be made on the assumption that the invention is applied to the recording apparatus of Y-T type for the convenience' sake. However, it should be appreciated that the invention is never restricted to such type recording apparatus but can equally be applied to a X-Y type recording apparatus. The sprocket means is adapted to be driven by a sprocket driving unit which is composed of an electric motor and a driving circuit therefor and which is accommodated within the main body 11. There is provided a knob 17 for allowing the recording sheet 10 to fed manually. To this end, the knob 17 is pressed toward the sprocket to be coupled thereto. A control panel 13 is provided for controlling and manipulating operations of the spectrophotometer and recording apparatus. Among switches provided on the control panel 13, there is a scan switch. Upon actuation or depression of the scan switch, measurement as well as recording operation are simultaneously initiated.

Figure 2:
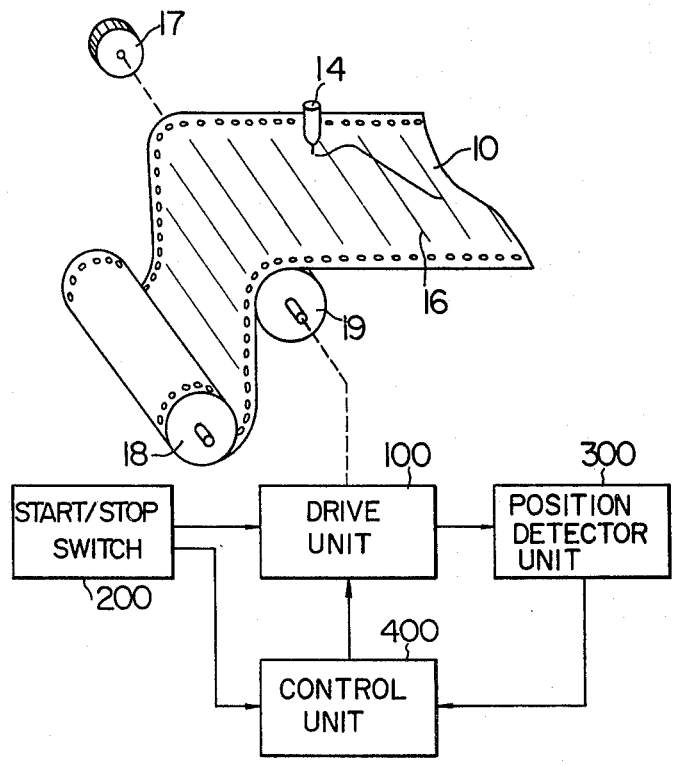
FIG. 2 is a general block diagram showing an embodiment of the invention.

Next, the basic concept of the illustrated embodiment of the invention will be described by referring to FIG. 2. The recording sheet 10 is stored in a form of a roll 18. The dispensed recording sheet 10 is pressed against the sprocket 19 by means of a sheet pressing member (not shown). The sprocket 19 is fixedly mounted on a shaft which is operatively connected to an electric motor of the drive unit 100 through a gear train or the like transmission mechanism. As described hereinbefore, the drive unit 100 incorporates therein a driving circuit for the motor. The start/stop control for the drive unit 100 is effected by a corresponding signal produced by a start/stop switch 200. A position detector unit 300 is operatively coupled to the drive unit 100. In this connection, the position detector unit 300 may be electrically connected to the driving circuit of the drive unit 100 or alternatively mechanically connected to a motor shaft or the like element of the drive unit 100. The position detector unit 300 serves to detect the position of the recording pen 14 relative to the ruled lines 16 printed on the recording sheet 100 with a predetermined inter-line space. In precedence to the recording operation, a given ruled line 16 is brought into coincidence with the position of the recording pen 14 through manual manipulation of the knob 17. During the recording operation, the positional relationship between the recording pen 14 and the ruled lines 16 is successively detected by the position detector unit 300. When a stop signal is supplied to the drive unit 100 from the start/stop switch 200 to the drive unit 100, the same signal is supplied also to a control unit 400 which then responds thereto for determining on the basis of the information available from the detector unit 300 whether the position of the recording pen 14 coincides with the given ruled line 16. When the ruled line 16 is in non-alignment with the position of the recording pen 14, the control unit 400 issues a drive command to the drive unit 100, whereby the recording sheet 10 is successively fed. During the feeding of the recording sheet 10, the detector unit 300 detects the positional relationship between the recording pen 14 and the ruled line 16 on the recording sheet 10. Upon occurrence of the coincidence between the position of the recording pen 14 and one of the ruled line, the control unit 400 confirms the coincidence from the information available from the detector unit 300 to thereby issue the drive stop command to the drive unit 100. In this manner, a ruled line on the recording sheet is automatically brought into coincidence with the position of the recording pen upon completion of the recording operation.

The above description has been made on the assumption that the recording apparatus in concern is of a Y-T type. However, the concept of the invention can equally be applied also to the recording apparatus of X-Y type. More particularly, in the case of the X-Y type recording apparatus, the carriage 15 itself is arranged so as to be displaced to the left or the right rather than the recording sheet 10 is successively fed out. A drive mechanism for the carriage 15 is usually composed of a cord suspended between and around a pair of pulleys, wherein the carriage is fixedly connected to a portion of the cord. Thus, the carriage is caused to move to the left or to the right in dependence on the rotation of the pulleys in one or the other direction. The rotation of the pulley may be effected by the drive shaft of the electric motor of the drive unit 100 shown in FIG. 2, thereby to operate the recording apparatus as the X-Y type recording system.

Now, an exemplary embodiment of the invention will be described by referring to FIG. 3 on the assumption that the recording apparatus in concern is of the so-called Y-T type. The displacement of the recording sheet 10 in the direction along the abscissa is effected by a pulse motor 12, while the recording in the direction along the ordinate is performed by displacing the recording pen 14 correspondingly through a recording pen driving mechanism (not shown). The recording sheet 10 is previously printed with ruled lines 16 with a predetermined inter-line space. To describe an exemplary construction of the drive unit 100, the pulse motor 12 is adapted to be driven by a pulse motor drive unit 20 which is composed of a sequence circuit 22, a switch circuit 24 and a drive power source 26. In the case where a four-phase pulse motor of a single-phase excitation type is employed as the pulse motor 12, for example, the sequence circuit 22 is constituted by a logic circuit which functions to convert output pulses from a pulse generator 30 into quaternary pulse trains for preparing the sequence to excite the individual phases of the four-phase pulse motor. On the other hand, the switch circuit 24 serves to turn on and off a current supplied from the drive power supply source 26 to the pulse motor 12 through a series resistor in accordance with the signal from the sequence circuit 22 to thereby excite sequentially the individual phases of the pulse motor 12 to cause the latter to be stepwise rotated. In this manner, the pulse motor 12 is rotated for a predetermined angle for every output pulse produced from the pulse generator 30. By the way, three factors are conceivable for determining the displacement of the recording sheet 10 for the single pulse from the pulse generator 30. The first factor is the excitation type adopted for the pulse motor. The second factor is a rotation angle of the pulse motor 12 for a single input pulse in a conventional single-phase excitation system. The third factor is a reduction gear ratio of a reduction gear train (not shown) interposed between the pulse motor 12 and the sprocket wheel (not shown in FIG. 3) for driving the recording sheet 10. For simplification of description, it is assumed in the following elucidation that the ruled lines are printed with an inter-line space of 1 cm and 100 pulses are required for moving the recoridng sheet 10 by a distance of 1 cm. Such feeding conditions can be easily realized by appropriately selecting and combining the factors described above.

Manipulating procedures as well as the involved operations of the recording apparatus will be described below in detail. For the initiation of the recording operation, a knob (not shown in FIG. 3) mounted on a driving shaft for the recording sheet 10 is at first manually rotated to bring a given one of the ruled lines 16 in a position coinciding with that of the recording pen 14. Subsequently, a switch 42 connected to a reset terminal RESET of a counter 40 provided in the detector unit 300 is once changed over to a contact position C thereby to clear the contents in the counter 40 to zero. The counter 40 may be constituted by two decimal counters connected in series to each other so that the contents of the counter 40 as displayed may vary from "00" to "99" in the decimal notation. On the other hand, 100 pulses are required for displacement of the recording sheet 10 by a distance of 1 cm on the prerequisite assumption mentioned above. Accordingly, when the position of the recording pen 14 coincides with one of the ruled lines 16, the contents of the counter 40 is equal to zero, which in turn means that the zero state of the counter 40 attained through the periodical counting operation thereof will always indicate the coincidence or alignment between the recording pen 14 and one of the ruled lines 16 in respect of the position thereof.

After the initialization or preparatory procedure described above has been completed, a switch 44 of the start/stop switch 200 is changed over to a contact position A for initiating the recording operation. The switch 44 has the other contact which is connected to one input terminal of a dual-input AND gate 50 which has the other input terminal connected to the pulse generator 30. Thus, upon changing-over of the switch 44 to the contact position A, a high or "H" level (logic "1") appears at the input terminal of the AND gate 50 to which the switch 44 is connected, as the result of which the AND gate 50 is enabled to conduct therethrough the pulses from the pulse generator 30. The fixed contact B of the switch 44 is additionally connected to an input terminal of a dual-input AND gate 53 through an inverter 52. Thus, in the state in which the switch 44 is closed to the contact position A, the output of the inverter 52 is at a low "L" level (logic "0"), resulting in that the AND gate 53 being nonconductive with the "L" level appearing at the output terminal of the AND gate 53, causing the output of a succeeding AND gate 54 to be at the "L" level. Under the conditions, the pulses produced by the pulse generator 30 and gated through the AND gate 50 are supplied to the pulse motor drive unit 20 through an OR gate 56, the output of which is connected also to a count-down input DOWN of the counter 40 of the detector unit 300. Thus, the output pulses from the OR gate 56 are applied also to the count-down input DOWN of the counter 40 to thereby decrement sequentially the contents of the counter 40. In this manner, the instantaneous contents being decremented indicates the number of pulses required for the relative displacement of the recoridng pen to the succeeding one of the ruled lines 16.

Next, description will be made of operation for terminating the recording operation. The termination of the recording is effected by changing over the switch 44 of the start/stop switch circuit 200 to the contact position B. The input terminal of the AND gate 50 connected to the switch 44 will then become at the "L" level, whereby the AND gate 50 is inhibited from conducting therethrough the pulses from the pulse generator 30. On the other hand, the output from the inverter 52 of the control unit 52 takes the "H" level. Thus, the output from the AND gate 53 having the other input connected to an OR gate 58 is at "H" level or logic "1" only if the output from the OR gate 58 is logic "1" or "H". Under the circumstances, the AND gate 54 is enabled to conduct therethrough the pulses from the pulse generator 30. It should be noted that the OR gate 58 functions to produce a logic sum of the contents in the counter 40. Accordingly, unless the recording pen 14 is positioned just on or above the one ruled line 16, the output from the OR gate 58 is at logic "1" or "H" level, since then the contents in the counter 40 is not equal to zero. Under the circumstances, the logic "1" or "H" level makes appearence at the output terminal of the AND gate 53 to make the AND gate 54 to be conductive whereby the pulses from the pulse generator 30 are supplied to the pulse motor drive unit 20 and the counter 40 through the OR gate 56. Thus, the contents in the counter 40 are decremented in response to the input pulses until contents "zero" has been attained, whereupon the output of the OR gate 58 becomes logic "L" or "0". The feeding of the recording sheet 10 is thus continued to the time point when the contents in the counter 40 becomes zero. In this manner, when the recording operation terminating command, i.e. stop command is issued in the state in which the position of recording pen 14 is out of alignment with the succeeding one of the ruled lines, the sheet feeding operation is continued until the positional coincidence has been attained between the recording pen and the ruled line on the recording sheet, whereupon the sheet feeding operation is automatically stopped. Thus, the succeeding measurement and recording can be initiated at the properly indexed position at which the recording pen is disposed just above a ruled line.

In the foregoing, description of the up- and down-movements of the recording pen 14 has been omitted. However, it will be readily appreciated that arrangement may be made such that the recording or recording pen 14 is interlocked with the switch 44 for moving downwardly the pen 14 to bring it into contact with the recording sheet 10 when the switch 44 is changed over to the contact position A for initiating the recording operation, while the pen 14 is moved upwardly away from the recording sheet 10 in response to the changing-over of the switch 44 to the contact position B for terminating the recording operation.

Although description has been made to such effect that the positional correction of the recording or recording pen 14 relative to a ruled line on the recording sheet is effected immediately after the command for terminating the recording operation has been issued, it will be appreciated that such positional correction of the recording pen may be carried out later on in precedence to the starting of the succeeding recording operation. However, the positional correction of the pen 14 effected immediately after the termination of the recording operation is preferred over the correction performed before initiation of the succeeding recording in consideration of the involved problems. Namely, the positional correction of the pen 14 before initiation of the recording operation will means that the actual recording operation is initiated with a certain time lag with reference to the issue of the start command, which time lag is involved for performing the positional correction of the pen 14. Under the circumstances, when a certain reaction process brought about by adding a reagent to a specimen to be analyzed is to be recorded, difficulty will be encountered in attaining a synchronous timing between the addition of the reagent and the initiation of the actual recording, eventually resulting in a positional deviation from a ruled line for recording the effect brought about by the addition of the reagent. Further, there may possibly arise the case in which the recording is rendered impossible for the initial phase of the reaction. Besides, since the contents of the counter 40 is lost when the power supply source is turned off, the positional alignment between the recording pen and a ruled line on the recording sheet is required after a shut down or service interruption.

In view of the problems involved in the correction indexing of the writing pen in precedence to the recording operation such as described above, the illustrated embodiment of the invention in which the corrective pen indexing takes place automatically in succession to the recording operation is advantageous and preferable in respect of the improved performance.

The advantageous feature of the illustrated embodiment of the invention becomes more significant in applications described below.

In the case of the spectrophotometer, there is known a recording procedure referred to as a repeated scanning method according to which spectral variation as a function of time is observed and recorded through repeated scannings over a predetermined wavelength range. The recording may be made either in a paralleled pattern or in a serial recording pattern. The serial recording in which the recording sheet is successively fed is advantageous in that data disposal and examination are much facilitated. In the hitherto known serial recording through the repeated scanning, it often occurs that the position of the recording pen is deviated from the ruled line at which recording is to be started for the second or succeeding recording scan cycle. Of course, the manual realignment of the recording pen with the concerned ruled line on the way of the analyzing process is a cumbersome procedure. In this respect, it is noted that the recording apparatus according to the illustrated embodiment of the invention can assure consistently the positional coincidence between the recording pen and the ruled line for every starting of the scanning cycles, whereby variation as a function of a variable or time taken along the abscissa can be read out easily.

Further, in a gas and a liquid chromatograph, there is a case where a plurality of specimens are to be successively examined with the aid of an appropriate sampling mechanism. According to the invention, once the recording pen is positioned in alignment with the ruled line for the first recording, the positional alignment can be automatically effected for the second and succeeding recordings.

Further, in the case of the spectrophotometer, chromatograph, massspectrometer and nuclear magnetic resonance spectrometer, it is sometimes required that magnification in the abscissa direction is performed to scrutinize fine structures or patterns of a number of peaks in concern contained in the measured spectra or magnification in the ordinate direction is to be made to examine plural fine peaks. In such case, once the position alignment or matching between the recording pen and a ruled line is made in precedence to the first peak measurement, the position alignment can be automatically conducted for the second and further succeeding peak measurements.

Because the recording or writing pen is automatically moved upwardly away from the recording sheet at every termination of individual measuring phases to thereby interrupt the recording, the results of the individual measurements can be clearly discriminated from one another.

Further, by virtue of the arrangement in which a pulse motor is employed for feeding the recording sheet in the abscissa direction with the information about the position of the recording pen relative to the ruled lines being obtained in terms of the pulse number, the positioning of the recording pen to the ruled line can be accomplished with an enhanced accuracy.

Additionally, no specific requirement is imposed on the recording sheet. Conventional recording sheets having ruled lines printed with a normal interline space can be used.

No specific means for deriving the information of the pen position is required, since the pulses supplied to the pulse motor is made use of for obtaining such information.

Figure 3:
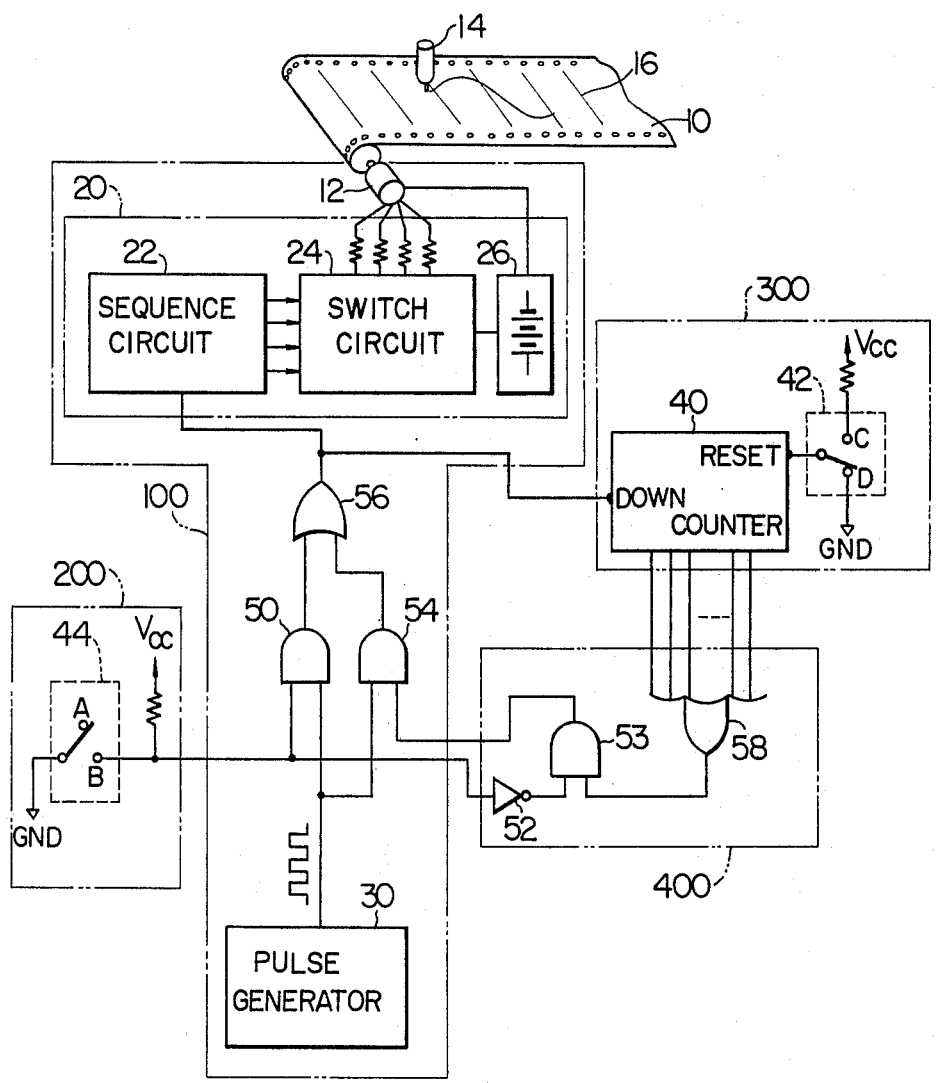
FIG. 3 is a block diagram showing an arrangement of the recording system according to an embodiment of the invention.
Figure 4:
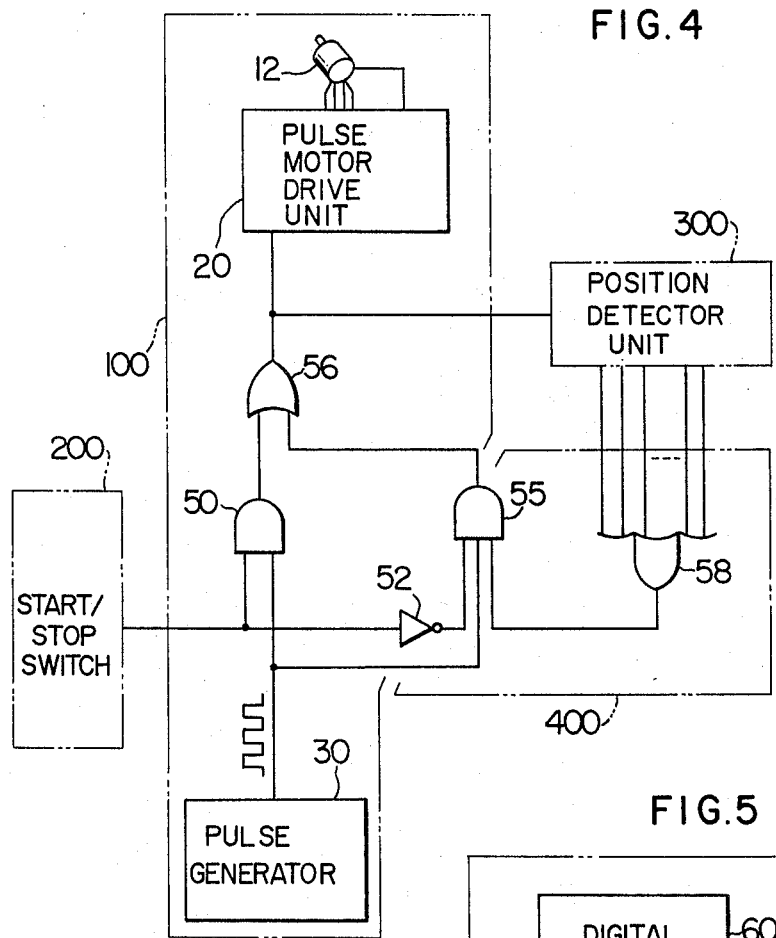
FIG. 4 is a block diagram showing another embodiment of the invention.

Referring to FIG. 3, the terminating or stop signal fed to the inverter 52 of the control circuit 400 is shown as supplied from the drive unit 100. However, practically, the stop signal is supplied from the start/stop circuit 200 directly to the control circuit 400 as illustrated in FIG. 2. Of course, the circuit may be designed such that the stop signal is supplied to the control unit 400 by way of a circuit portion of the drive unit 100 as shown in FIG. 3.

It may happen that the drive unit 100 can not be definitely discriminated from the control circuit 400 in terms of electronic circuit integration. For example, the triple-input AND gate 55 functions to produce a logic product from the output of the OR gate 58, the output stop signal from the inverter 52 and the output pulses from the pulse generator 30. In this sense, it can be said that the AND gate 55 serves not only as a part of the control circuit 400 but also as a part of the drive unit 100. Such being the circumstances, the control circuit 400 and the drive unit 100 can not be physically separated from each other in a strict sense. However, both the units can be identified as the drive unit and the control circuit from the viewpoint of the respective unique functions.

In the foregoing description, it has been assumed that the ruled lines are drawn with an inter-line space of 1 cm. However, there are known recording sheets which have the ruled lines printed with the inter-line spaces of 2 cm, 1 inch and so forth. Now, description will be made of exemplary embodiments of the recording apparatus according to the invention which allow the ruled recording sheets of these different inter-line spaces to be used, by referring to FIGS. 5 and 6. In these figures, only a circuit portion corresponding to the position detector unit 300 shown in FIG. 3 are illustrated, wherein the same elements as those shown in FIG. 3 are denoted by like reference numerals.

Figure 5:
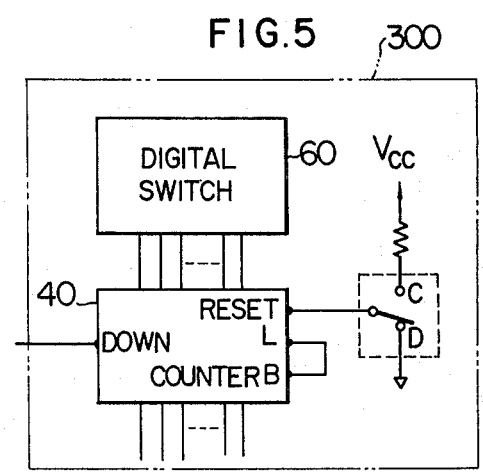
FIGS. 5 and 6 are block diagrams showing modifications of detector device employed in the recording system according to the invention.

Referring to FIG. 5, numeral 60 designates a digital switch at which any given decimal numeral can be set. The output from the digital switch 60 can be loaded into a counter 40 in BCD (binary-coded decimal) code. Accordingly, when 100 pulses are required for feeding the recording sheet 10 by a distance of 1 cm, the digital switch 60 may be implemented with three digit positions, while the counter 40 may be constituted by three decimal counters connected in series to one another. Depending on the display of the digital counter 60, "100" is set at the counter 40 in case the inter-line space is 1 cm, while "200" is set when the inter-line space is 2 cm. When "100" is preset in terms of the decimal notation in the counter 40, the contents in the counter 40 will become zero when 100 pulses are applied to the count-down input terminal of the counter 40. At that time, a borrow output from the most significant digit position of the counter 40 is applied to a load input terminal L thereof, whereby the contents of the digital switch 60 is placed in the counter 40. By repeating the procedure described above, similar operations as in the case of the recording apparatus shown in FIG. 1 can be accomplished.

The arrangement described just above allows replacement of the recording sheets having different inter-line spaces in cm. unit or replacement of the recording sheets printed with the ruled lines in different space units such as cm. and inch, and thus can enjoy a great versatility.

Figure 6:
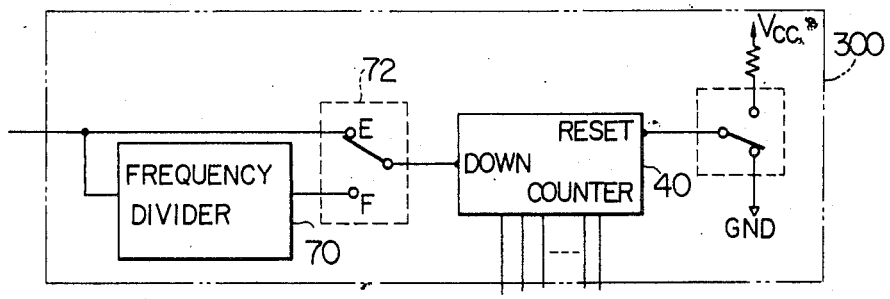

Referring to FIG. 6, reference numeral 70 denotes a frequency divider and 72 designates a change-over switch. It is assumed that recoring sheets having the inter-line spaces of 1 cm and 2 cm can be alternatively used and that 100 pulses are required for the displacement of the recording sheet by a distance of 1 cm. Under the conditions, the frequency dividing ratio is selected equal to ½. When the change-over switch 72 is positioned to a contact E, similar operation as in the case of the recording apparatus illustrated in FIG. 3 takes place. When the switch 72 is changed over to the contact position F, 200 pulses supplied to the input of the frequency divider 70 results in 100 pulses at the output terminal thereof. Accordingly, in the case of a recording sheet having ruled lines printed with the inter-line space of 1 cm, the change-over switch 72 is positioned at the contact E, while in the case of a recording sheet having an inter-line space of 2 cm, the switch 72 is changed over to the contact position F. In this manner, the recording sheets having the different inter-line spaces can be replaced by each other in a much facilitated manner merely by changing over the switch 72 to the corresponding positons.

As an alternative, means may be provided for storing two kinds of invariable logic values in place of the digital switch shown in FIG. 5, whereby one of the logic values is selectively loaded into the counter through a suitable change-over switch.

It will be appreciated that the arrangements shown in FIG. 6 will allow the recording apparatus to be adapted to the recording operation with a replaced recording sheet solely by changing over the line space changing switch.

Figure 7:
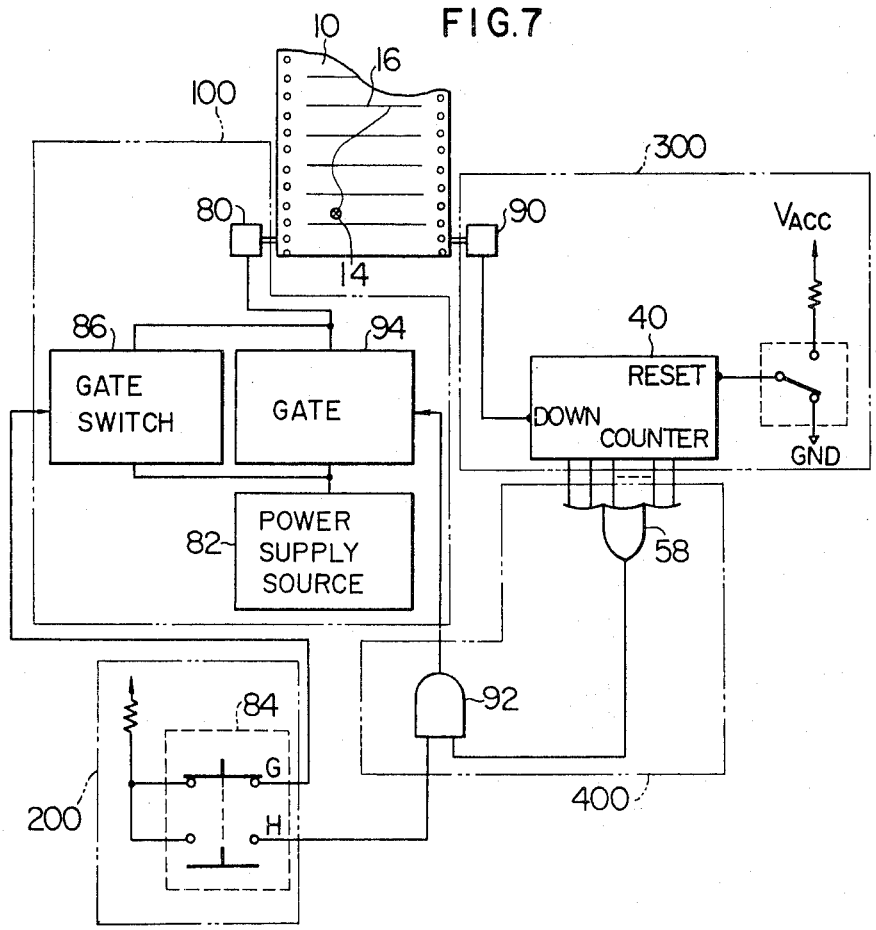
FIG. 7 is a block diagram showing still another embodiment of the invention.

In the examplary embodiments of the invention described so far, it is assumed that a pulse motor is used as the drive source for feeding the recording sheet in the direction along the abscissa. However, such drive source may be implemented by other conventional motor. An exemplary arrangement in which a motor other than the pulse motor is employed is shown in FIG. 7. Referring to this figure, a drive source 80 which may be constituted by a DC motor or a synchronous motor is supplied with a current from a power supply source 82 and operates to rotate the sprocket for feeding the recording sheet 10. Numeral 90 denotes a pulse generator coupled to a shaft on which the sprocket is fixedly mounted. Alternatively, the pulse generator 90 may be mounted on a shaft of the drive source 80. The pulse generator may be implemented in the form of a rotary encoder, for example, which is composed of a disc having a plurality of slits formed in a peripheral edge portion thereof and a pair of photo-couplers disposed in opposition to each other with the disc being interposed so that the photo-electric element constituting a part of the photo-coupler produce an electric signal evertime when and only when one of the slits formed in the disc passes by the photo-couplers. The signal thus produced is shaped into a pulse. For simplification of description, it is assumed that the pulse generator 90 is connected to the rotating shaft of the sprocket through a speed increasing transmission having a ratio such that the pulse generator 90 has to produce 100 pulses for a displacement of 1 cm of the recording sheet 10. Consequently, functions of the counter 40 and the OR gate 58 remain same as those shown in FIG. 3.

Upon initiation of the recording operation, the position of the recording pen 14 is brought into coincidence or alignment with one of the ruled line 16 and the contents of the counter 40 is cleared. Subsequently, the measurement may be started by changing over a switch 84 to a contact position G with contacts H being opened. Thus, a gate circuit 86 becomes conductive whereby electric energy is supplied to the drive source 80.

For terminating the recording operation, the change-over switch 84 is turned to the contact H, as the result of which the AND gate 92 is enabled. At that time, if the output from the OR gate 58 is at logic "1" or "H" level, the gate 94 is caused to be conductive to allow the recording sheet to be fed. When the contents in the counter 40 becomes zero, i.e. when the recording pen 14 is positioned in alignment with another one of the ruled lines 16, the output from the OR gate 58 becomes logic "0" to block the gate 94.

In the case of the embodiment described just above with reference to FIG. 7, by virtue of such arrangement that the position of the writing pen is automatically brought into alignment with one of the ruled lines printed on the recording sheet upon termination of the recording operation, there arises no necessity for readjusting the pen position relative to the ruled line to establish the positional coincidence therebetween upon starting the next succeeding recording operation, whereby the operation performance or manipulatability of the recording apparatus can be significantly enhanced.

Figure 8:
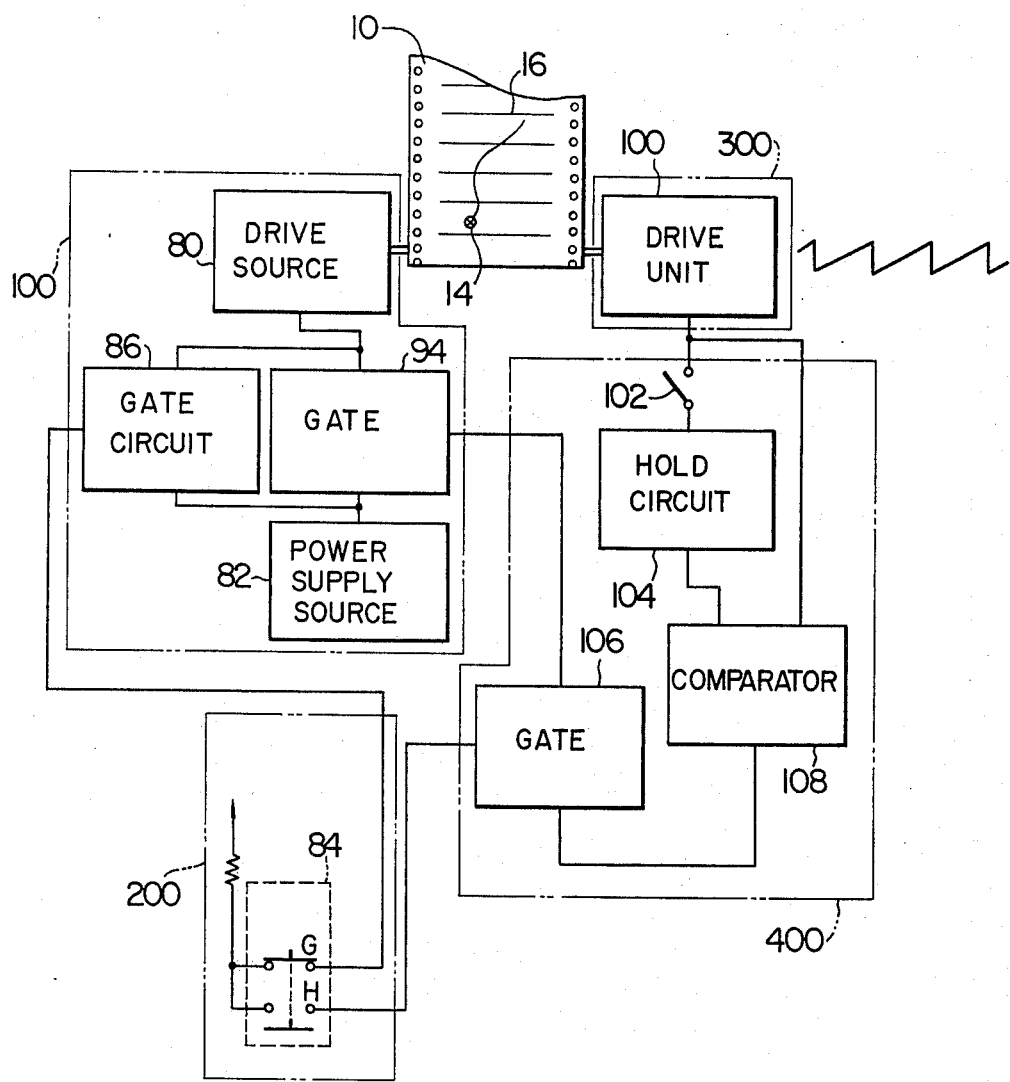
FIG. 8 is a block diagram showing a further embodiment of the invention.

In the foregoing description, the quantity representing the distance between the position of the recording pen and the adjacent one of the ruled lines or the recording sheet after a recording operation is processed digitally. However, it will be appreciated that analogical processing is also possible. A typical arrangement adapted for the analogical processing is illustrated in FIG. 8, in which the drive source is realized in the same manner as is shown in FIG. 7. Hence, description will be made particularly in conjunction with the feeding of the recording sheet. The displacement of the recording sheet 10 relative to the recording pen 14 is represented by a signal generated from a displacement generator 100 which may be constituted by a potentiometer to produce cyclically a minimum value to a maximum value for every predetermined distance between the ruled line on the recording sheet. In other words, the displacement signal generator produces a minimum level signal at a position aligned with a given ruled line and a maximum level signal at a position adjacent to but short of the next ruled line with the output signal being reset to the minimum level upon positioning of the recording pen just on or above the next ruled line and so forth.

For initiating the recording operation, the recording pen 14 is positioned in alignment with a given one of the ruled lines 16. At that time, the displacement signal generator produces an output of a predetermined minimum level. In succession to the position matching or alignment of the pen, a switch 102 is once turned on to thereby allow the current output level of the displacement signal generator 100 to be held by a hold circuit 104, and the switch 102 is again opened. The initiation and the termination of the recording operation are commanded by a change-over switch 84. At the end of the measurement, the switch 84 is changed over to the contact position H, as the result of which a gate 106 is opened. On the other hand, the instant output level from the displacement signal generator 100 is compared with the output level from the hold circuit 104 through a comparator 108 which is so arranged that the output thereof becomes zero when the two inputs thereto coincide with each other. Unless the output from the comparator 108 is zero, a gate 94 is caused to be conductive through a gate 106 to thereby energize the drive source 80. When the output of the comparator 108 attains zero level, the gate 94 is blocked.

In the case of the arrangement described just above, because the position of the writing pen is automatically brought into alignment with a given one of the ruled line upon completion of a recording operation, it becomes unnecessary to match again the pen position to the ruled line on the recording sheet in precedence to the initiation of a succeeding recording operation, whereby the manipulatability is remarkably improved.

Further, since a conventional inexpensive d.c. motor is used for feeding the recording sheet in the direction along the abscissa, the recording apparatus can be embodied inexpensively.

Additionally, due to the analogical implementation, the circuit arrangement can be significantly simplified.

Figure 9:
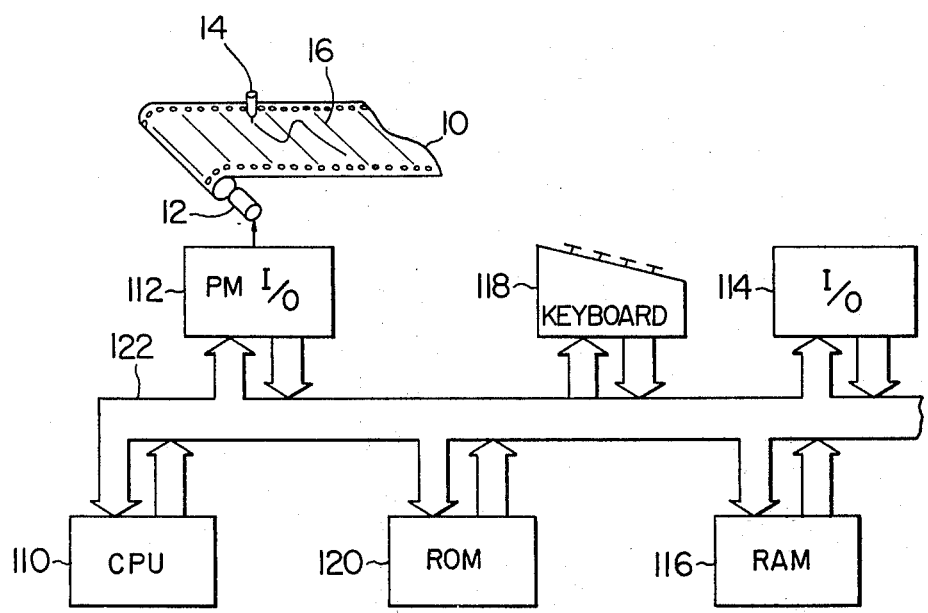
FIG. 9 is a basic block diagram illustrating an embodiment of the invention in which a central processing unit is employed.

The recording apparatus described above so far are controlled with the aid of hardwares. However, the recording operation can be controlled through software technique by resorting to the use of a computer. Typical examples of the software arrangement will now be described by referring to FIGS. 9 and 10. Referring to a block diagram shown in FIG. 9, there is provided a pulse motor 12 for feeding a recordinhg sheet 10 in the abscissa direction. The pulse motor 12 is controlled in accordance with commands supplied from a central processing unit 110 (hereinafter referred to as CPU in abridgment) through a pulse motor input/output interface 112 (hereinafter referred to as PM I/O). Output data from analyzing apparatus is written in a random access memory 116 (hereinafter referred to RAM) through an input/output interface 114 (hereinafter referred to as I/O in abridgment). Further, various condition parameters are input through a keyboard 118. A program or software described hereinafte is previously stored in a read-only memory 120 (hereinafter referred to as ROM in abridgment). Transfer of data and control instructions among I/O, RAM, ROM, CPU and so forth are effected through a bus line 122.

Figure 10:
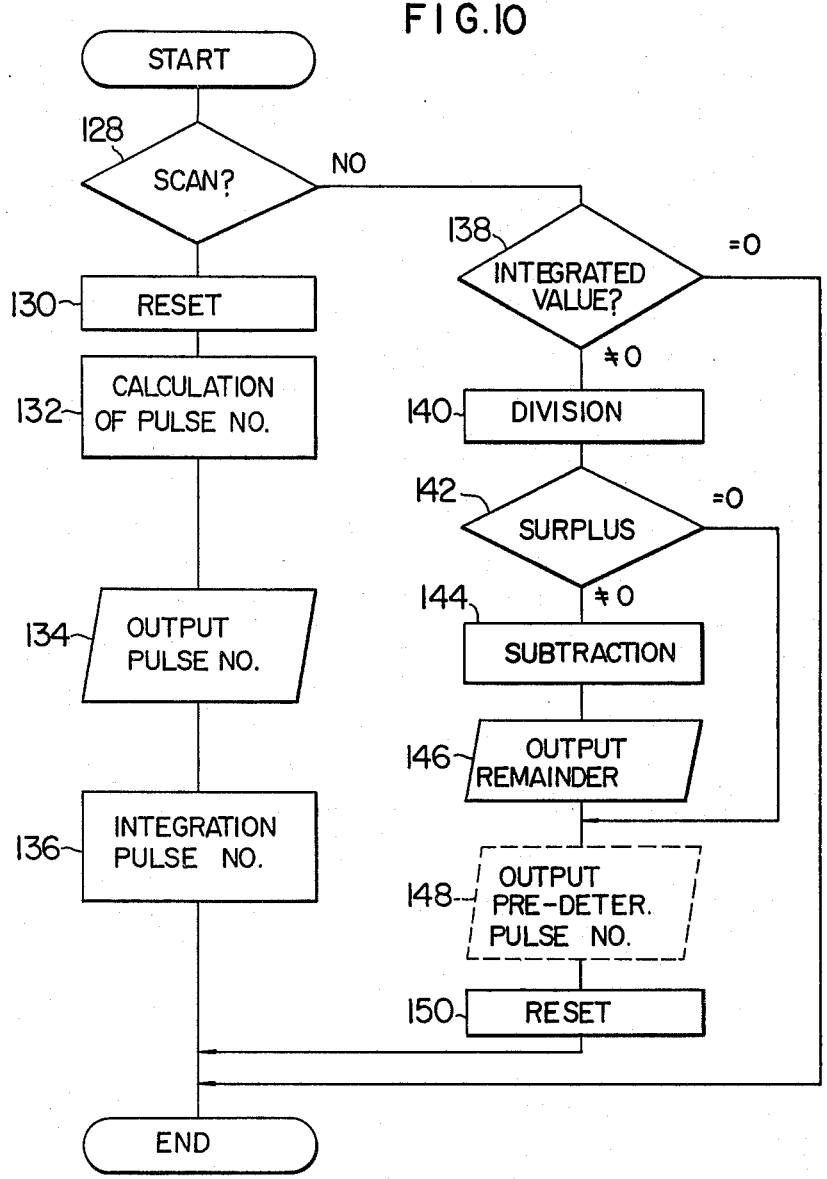
FIG. 10 is a flow chart to illustrate operation of the apparatus shown in FIG. 9.

Next, description will be made by referring to a flow chart shown in FIG. 10. The sequence illustrated in this flow chart is previously stored in ROM 120. In this flow chart, a broken line block 148 belongs to another example which will be described later on.

In the first place, it is assumed that the recording apparatus is used in combination with a spectrophotometer. As a preparatory procedure, informations about range of wavelength to be scanned, magnification factor for recording, scanning speed and the like are input through the keyboard 118 and memorized in the RAM 116. When a measurement starting command is input subsequently, the programmed routine is branched from a decision block 128 to a reset block 130. Since the number of pulses supplied to the pulse motor 12 is accumulated in RAM 116 at a predetermined address, the contents stored at this address is reset through the reset processing 130. At a succeeding block 132, number of pulses to be fed to the pulse motor 12 is calculated on the basis of the relevant information stored in the RAM 116 in the preparatory procedure. The number of pulses as calculated is output and placed in the PM I/O 112 through I/O 114 at a step corresponding to the block 134. Then, the pulse motor 12 is driven. On the other hand, through the processing by CPU 110, the number of pulses fed to the pulse motor 12 from the PM I/O 112 is accumulated and stored in RAM 116 at a predetermined address thereof as represented by a block 136. Upon termination of the scanning and the spectrum recording, the answer of the decision block 128 is then "NO". Thus, the routine is branched from the decision block 128 to a decision block 138 at which it is decided whether the number of the output pulses stored in the processing block 136 is zero or not. When the accumulated and stored pulse number (block 136) is decided to be equal to zero, i.e. the pulse motor 12 is stationary, the routine comes to an end (END), since no correction is required. On the other hand, if the accumulated and stored pulse number is not equal to zero, indicating that the pulse motor 12 is still in motion, the routine proceeds to a next block 140 at which the number of the accumulated and stored pulses is divided by a number of pulses required for the displacement of the recording sheet relative to the recording pen from a give ruled line to the succeeding ruled line. The remainder resulting from the division is the pulse number which represents the overshoot of the recording pen 14 from the final ruled-line position. At a block 142, it is decided whether the remainder is equal to zero. If so, this means that the position of the recording pen 14 is aligned with the concerned ruled line. Consequently, the routine proceeds to a block 150 at which the accumulated and stored pulse number is reset to make preparation for a succeeding measurement. Then, the routine comes to an end "END". In case the remainder is found not to be equal to zero at the block 142, the number of pulses required for displacing the recording sheet from the instant position of the recording pen to the position at which the recording pen is aligned with a succeeding ruled line is arithmetically determined through subtraction. The number of pulses corresponding to the difference value resulting from the operation at the block 144 is set at the PM I/O 112 through I/O 114 to operate the pulse motor 12 at a block 142. Thereafter, the routine proceeds to the block 150 described hereinbefore and comes to an end.

In the case of the software arrangement described just above, by virtue of the fact that the recording pen is automatically positioned in alignment with a succeeding ruled line on the recording sheet upon completion of a recording operation, the realignment of the pen position and the ruled line is unnecessary for the succeeding measurement, whereby the manipulation or control of the apparatus is much facilitated.

Further, because the software is adopted for controlling the recording operation, alteration as well as addition of precedure and contents can be easily achieved.

Next, the I/O function shown in a broken line block 148 will be described. When it is decided by the decision block 142 preceding to the I/O function block 148 that the remnant it equal to zero or when the remnant is not equal to zero but difference is produced from the block 146, the position of the recording pen 14 is aligned with the ruled line. In these situations, a predetermined number of pulses are output from the PM I/O 112 which number corresponds to the one representing the interline space itself multiplied or not multiplied by an integer.

The procedure described just above brings about following advantages. Assuming that the recording pen is positioned near the succeeding ruled line upon termination of the recording operation and thus has to be moved only to the position of that ruled line, the results of the successive recordings will be difficult to be visually observed. Further, when the recording pen position coincides with the ruled line, the results of the successive recordings can not be discriminated from each other. Accordingly, by feeding the recording sheet by a single or two line spaces relative to the recording pen upon termination of the recording through the procedure described above, the results of the successive recordings can be easily discriminated from each other. Besides, the individual recording results can be conveniently cut away for storage.

Similar advantages are brought about in a wavelength programming procedure in a spectrophotometer. With the terminology "wavelength programming method", it is meant that a plurality of wavelengths to be measured are previously designated, whereby the spectrophotometer is sequentially set to the previously designated or programmed wavelengths to record successively the measured spectral values for the individual wavelengths. In a hitherto known wavelength programming procedure, the recording or writing pen in drived in a manner described below to depict a bar graph in view of the facility in reading the recorded values. That is, the recording pen is set down at the zero position of the ordinate and the recording sheet is fed to a given position of the abscissa. Subsequently, the recording pen is moved along the ordinate to a preset position for one of the designated spectral measurements with the recording sheet being held stationarily. Thereafter, a selected displacement of the recording sheet in the abscissa direction is performed at the attained ordinate position, which is then followed by the relative movement of the recording pen to the zero position in the ordinate with the recording sheet being subsequently fed in the abscissa direction. It will be readily appreciated that much complicated circuit configuration is required for depicting the bar graph in the manner described above.

In contrast, the above procedure can be easily accomplished by making use of the I/O function 148 described hereinbefore. For example, after the recording pen position has been set in coincidence with a given one of the ruled lines, recording for the first wavelength is performed over a single line space through the I/O output function 148. In succession, the recording is set for the spectral measurement for the second wavelength and performed over a single line space through the I/O function 148. In this manner, the ruled line of the recording sheet can be utilized as a line segment for a segment of a bar graph in the ordinate direction in the hitherto known bar graph recording, as the result of which measured spectral values for the programmed wavelengths can be recorded in an extremely simplified manner. In this connection, it is noted that a kind of wavelength sweeping is performed when measurement is changed over from the first to the second programmed wavelength. However, such sweeping is irrelevant to the measuring result and does not correspond in any sense to the scanning described hereinbefore in conjunction with the decision block 130. Since the recording pen is repeatedly displaced between the first and the wavelength positions in the ordinate direction, it is desirable that the recording pen be held up during such displacement.

Figure 11:
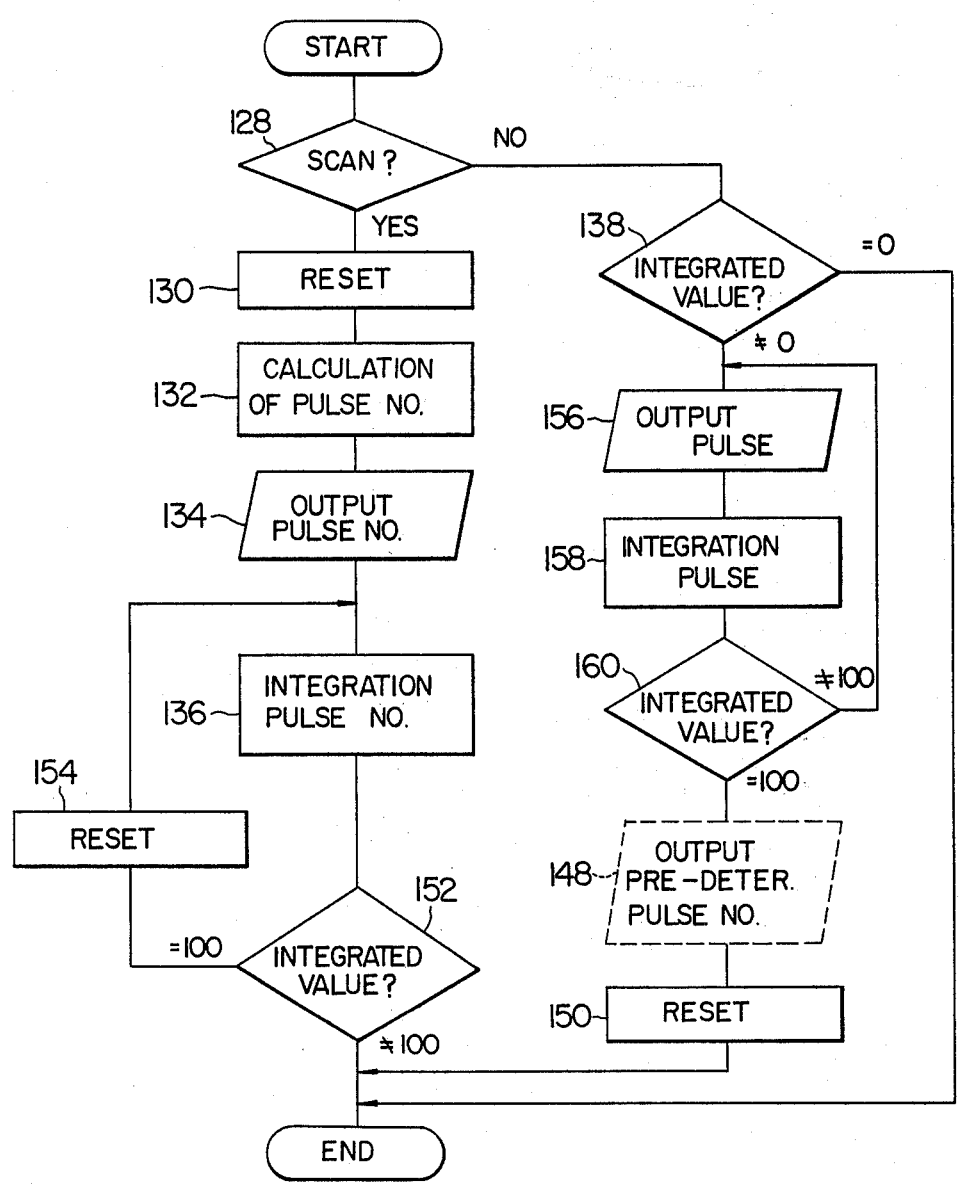
FIG. 11 is a flow chart illustrating operation of the recording system according to a further embodiment of the invention.

Another exemplary embodiment based on the software technique will be described by referring to a flow chart shown in FIG. 11, in which the same reference numerals as those used in FIG. 10 designates the identical decisions, processings or the like functions. The number of pulses accumulated and stored in RAM 116 at a predetermined address thereof at the processing block 136 is determined as to whether it is equal to "100" or not. When the number of the accumulated pulses has attained "100", the contents at the predetermined address of RAM 116 is reset to zero at the processing block 154. In other words, every time when 100 pulses are fed to the pulse motor 12 from PM I/O 112, the contents stored at the predetermined address of RAM 116 is reset to zero. Upon termination of the spectral measurement with the scanning being stopped, the routine proceeds through the decision block 128 to the decision block 138 where it is decided whether the number of the pulses accumulated and stored at the processing block 136 is equal to zero or not. In case the number of the accumulated pulses is not equal to zero, the routine proceeds to I/O function 156 when the pulses are supplied to the pulse motor 12 through the PM I/O function 112. At the same time these pulses are alos accumulated on the previously stored pulses in RAM 116 at the predetermined address through the processing function 158. At the decision block 160, it is decided that the number of pulses thus accumulated is equal to "100" or not. Until the pulse number has attained "100", the loop including the I/O function 156, processing 158 and the decision block 160 is repeatedly executed. When it is determined at the decision block 160 that the number of the accumulated pulses becomes equal to "100", this means that the recording or recording pen 14 is brought into coincidence with a ruled line. Then, the accumulated and stored pulsed number is reset, whereby the routine comes to "END" with the system regaining the state ready for the succeeding measurement.

In all the illustrated embodiments described above, it has been assumed that the recording apparatus of a Y-T system is used. However, the invention can be equally applied to the recording system of X-Y type.

Further, in place of the recording pen, other recording means such as heat sensitive element, discharge breakdown type element or the like may be adopted.

Thus, the invention has provided a recording apparatus which has been remarkably improved in respect of manipulatability and operation performance.

We claim:

1. A recording system in which recording means is driven in response to input signal while relative position between said recording means and a recording sheet is varied to thereby record said input signal, comprising:
   means for monitoring mutual positional relationship between said recording means and rules on said recording sheet which varies as the relative position between said recording sheet and said recording means is varied; and
   means for varying the relative position between said recording means and said recording sheet on the basis of positional information contained in said monitoring means upon termination of the recording until said recording means has been brought in positional coincidence with a rule on said recording sheet located in the direction in which said relative position is varied.

2. A recording system according to claim 1, wherein the rule which is brought into positional coincidence with the recording means by said relative position varying means is the one that is located farther from said recording means than the adjacent rule in the direction along which the rules are successively present.

3. A recording system according to claim 1, wherein said monitoring means is adapted to supervise the positional information in dependence on the variation in the relative position between said recording sheet and said recording means.

4. A recording system according to claim 3, wherein said monitoring means includes counter means for counting within a predetermined pulse number range the pulses produced as the relative position between said recording sheet and said recording means is varied, and said relative position varying means is adapted to vary the relative position between the rule on said recording sheet and said recording means mutually to each other until the contents in said counter means has attained a predetermined value.

5. A recording system according to claim 3, wherein said monitoring means includes counter means for counting pulses generated as the relative position between said recording sheet and said recording means is varied, and said relative position varying means is adapted to vary the relative position between the rule on said recording sheet and said recording means in accordance with the results of comparison between the contents contained in said counter means and a number of pulses corresponding to a space between adjacent rules on said recording sheet.

6. A recording system according to claim 3, wherein said monitoring means includes means for generating electric signals in one-to-one correspondence to a predetermined position of a point located between the adjacent rules on said recording sheet, and said relative position varying means is adapted to vary the relative position between the rule on the recording sheet and the recording means until the output signal from said monitoring means has attained a predetermined value.

7. A recording system, comprising:
   first means for moving either one of a recording sheet and a member for holding recording means relative to the other,
   detecting means connected mechanically or electrically to said first means for periodically detecting relative movement between said recording sheet and said recording means holding member with reference to a predetermined inter-line space between adjacent rules on said recording sheet; and
   control means for aligning a rule on said recording sheet and said recording means with each other on the basis of detection signal produced from said detecting means.

8. A recording system according to claim 7, wherein said first means comprises a pulse motor and pulse generating means for generating pulses for driving said pulse motor, while said detecting means includes means for counting pulses generated by said pulse generating means.

9. A recording system according to claim 7, wherein said detecting means is mechanically coupled to said first means and adapted to count pulses produced in dependence on said relative movement.

10. A recording system according to claim 7, wherein said detecting means is mechanically coupled to said first means and adapted to produce electric signals displaced in correspondence to the space between the adjacent rules varying in correspondence to said relative movement.

11. A recording system, comprising;
   means for recording variation of an input signal on a recording sheet having rulled lines printed previously with a predetermined inter-line space;
   drive means for varying relative position between said recording sheet and recording means in a direction orthogonal to the ruled line on said recording sheet;
   means for commanding start and stop of the variation in said relative position through said drive means;
   means for detecting positional information of said recording means relative to the ruled line in the direction in which said relative position is varied by said drive means; and
   means for controlling the relative position between said ruled line and said recording means in dependence on the positional information available from said detecting means after generation of a stop command from said command means until the position of the ruled line has coincided with that of said recording means.

12. A recording system according to claim 11, wherein the ruled line caused to coincide with said recording means through said control means is the one that is located adjacent to said recording means upon issuing of said stop command from said command means as viewed in the direction in which said relative position is varied through said driving means.

13. A recording system according to claim 11, wherein the ruled line caused to coincide with the recording means through said control means is the one that is located farther than the ruled line adjacent to the recording means upon issuing of the stop command from said control means in the direction in which the relative position is varied through said driving means.

14. A recording system according to claim 11, wherein said detecting means is interlocked with said relative position varying means and adapted to detect information of the relative position between said ruled line and said recording means.

15. A recording system according to claim 14, wherein
said driving means includes a motor and a driving circuit for driving said motor;
said detecting means includes means mechanically connected to a shaft of said motor and adapted to produce and electric signal in one-to-one correspondence with a position of a predetermined point located in the space between the ruled line or the recording sheet; and
said control means is adapted to compare the electric signal output from said detecting means with a value held in said control means to thereby produce a command for varying the relative position between said recording sheet and said recording means until coincidence has occurred between said value held by said control means and said electric signal output from said detecting means.

16. A recording system according to claim 14, wherein said drive means includes a motor and a driving circuit for said motor, and said detecting means includes an encoder coupled mechanically to a shaft of said motor and means for counting pulses generated from said encoder in dependence on rotation of said motor shaft.

17. A recording system according to claim 16, wherein said counter means is adapted to be periodically set to a predetermined value for every predetermined number of pulses corresponding to the space between the adjacent ruled lines on said recording sheet, while said control means is adapted to produce the command to said driving means for varying the relative position between said recording sheet and said recording means until the contents in said counter means has attained the predetermined value.

18. A recording system according to claim 14, wherein said drive means includes a pulse motor and pulse generating means for generating pulses to drive said pulse motor, and said detecting means includes counter means for counting the pulses generated from said pulse generating means.

19. A recording system according to claim 18, wherein said detecting means further includes means for varying frequency of the pulses input to said counter means.

20. A recording system according to claim 18, wherein said counter means is adapted to count the number of pulses supplied to said pulse motor during a period initiated and terminated by the start and the stop commands, respectively, produced from said command means, and said control means is adapted to arithmetically determine the relative displacement required for the positional coincidence between the recording means and a ruled line on the basis of the contents stored in said counter means and to produce said command on the basis of the arithmetically determined displacement.

21. A recording system according to claim 18, wherein said counting means is adapted to be periodically set at a predetermined value for every number of generated pulses corresponding to said inter-line space between the adjacent ruled lines on said recording sheet, and said control means is adapted to produce a command to said driving means to vary the relative position between said recording sheet and said recording means until contents in said counter means has attained a predetermined value.

22. A recording system according to claim 21, wherein the predetermined value placed in said counter means is variable.

* * * * *